United States Patent [19]

Pull et al.

[11] 3,913,997

[45] Oct. 21, 1975

[54] CABINET CLOSURE SYSTEM

[75] Inventors: Heino L. Pull, St. Louis County; Paul F. Rezabek, Jr., Hazelwood, both of Mo.

[73] Assignee: The United States of America as represented by the Secretary of the Air Force, Washington, D.C.

[22] Filed: July 9, 1974

[21] Appl. No.: 486,801

[52] U.S. Cl........ 312/223; 174/35 MS; 317/101 CB; 317/117; 317/120

[51] Int. Cl.²....................... A47C 77/08; A47B 81/00; H05K 09/00

[58] Field of Search........... 312/138, 223, 313, 314, 312/320, 326–330, 99; 317/101 CB, 101 CC, 101 DH, 117, 120; 174/35 MS, 35 GC

[56] References Cited

UNITED STATES PATENTS

| | | | |
|---|---|---|---|
| 2,319,415 | 5/1943 | Lightfoot | 317/117 |
| 3,088,054 | 4/1963 | Meyer | 317/120 |
| 3,564,112 | 2/1971 | Algotsson | 317/117 |
| 3,662,225 | 5/1972 | Carter | 317/101 CB |
| 3,691,432 | 9/1972 | Edfors | 317/101 CB |

*Primary Examiner*—Casmir A. Nunberg
*Attorney, Agent, or Firm*—Joseph E. Rusz; Jacob N. Erlich

[57] ABSTRACT

A cabinet closure system capable of providing both mechanical rigidity and RFI shielding. The closure system has a U-shaped closure element which relies upon a wedging-lever action for securely holding equipment in place. Because of the novel makeup of the closure element, a minimum amount of fasteners are required to secure the closure element in the sealed or closed position. In this manner quick removal of and/or installation of equipment is possible.

9 Claims, 6 Drawing Figures

CABINET CLOSURE SYSTEM

BACKGROUND OF THE INVENTION

This invention relates generally to cabinets, and, more particularly, to a cabinet closure system which finds its primary use in the quick removal and/or installation of rack mounted equipment.

It has long been a problem to install rack mounted equipment in a cabinet which provides both Radio Frequency Interference (RFI) shielding, as well as mechanical rigidity and, in so doing, also permit the rapid removal or installation of such equipment. In the past a common method of test drawer mounting in equipment cabinets has been to provide RFI gasketing and a number of closely spaced screws to provide both mechanical rigidity and RFI shielding.

The problem, however, is that the installation or removal of rack mounted equipment from these older RFI sealed racks is extremely time consuming. A screw driver has to be obtained and then 18 to 30 screws have to be removed for the removal of each piece of equipment.

SUMMARY OF THE INVENTION

The instant invention provides a new cabinet closure system which permits quick removal or installation of a piece of rack mounted equipment in less than one minute. In addition the closure provides complete RFI shielding protection. The quick removal or installation is possible through the use of specially designed rack fittings while the RFI protection is provided by inherent constant sealing pressure resulting from the lever action of the closure system.

The cabinet closure system of this invention is designed to securely hold equipment mounted in cabinets, consoles, racks, panels, etc. and can be installed by a minimum of hand tightening screws which secure the closure elements of the system. A horizontal bar in conjunction with arms in the closure system of this invention make up the support for the equipment. Four finger bolts in each arm secure the installed equipment and provide an environmental and RFI seal by providing pressure between the vertical rim of the arms holding the equipment and the counter lever rims. Pressure rims on the top and bottom horizontal section of the arms provide the horizontal pressure and sealing. It should be noted that the pressure is applied evenly against the edges of the mounted equipment assuring a continuous seal. This is an advantage over screws which make point contact and cause buckling or warping.

It is therefore an object of this invention to provide a cabinet closure system which produces a RFI and humidity seal by the folding of metal arms over the surface to be sealed.

It is another object of this invention to provide a cabinet closure system which incorporates therein a mechanical advantage, in the form of a lever, which provides less tension in the holding screws and thus permits finger bolts to be used in place of conventional screws.

It is still another object of this invention to provide a cabinet closure system which is economical to produce, and, which utilizes conventional currently available components that lend themselves to standard mass producing manufacturing techniques.

For a better understanding of the present invention together with other and further objects thereof reference is made to the following description taken in connection with the accompanying drawing and its scope will be pointed out in the appended claims.

DETAILED DESCRIPTION OF THE PREFERRED EMBODIMENTS

Figures 1, 2:
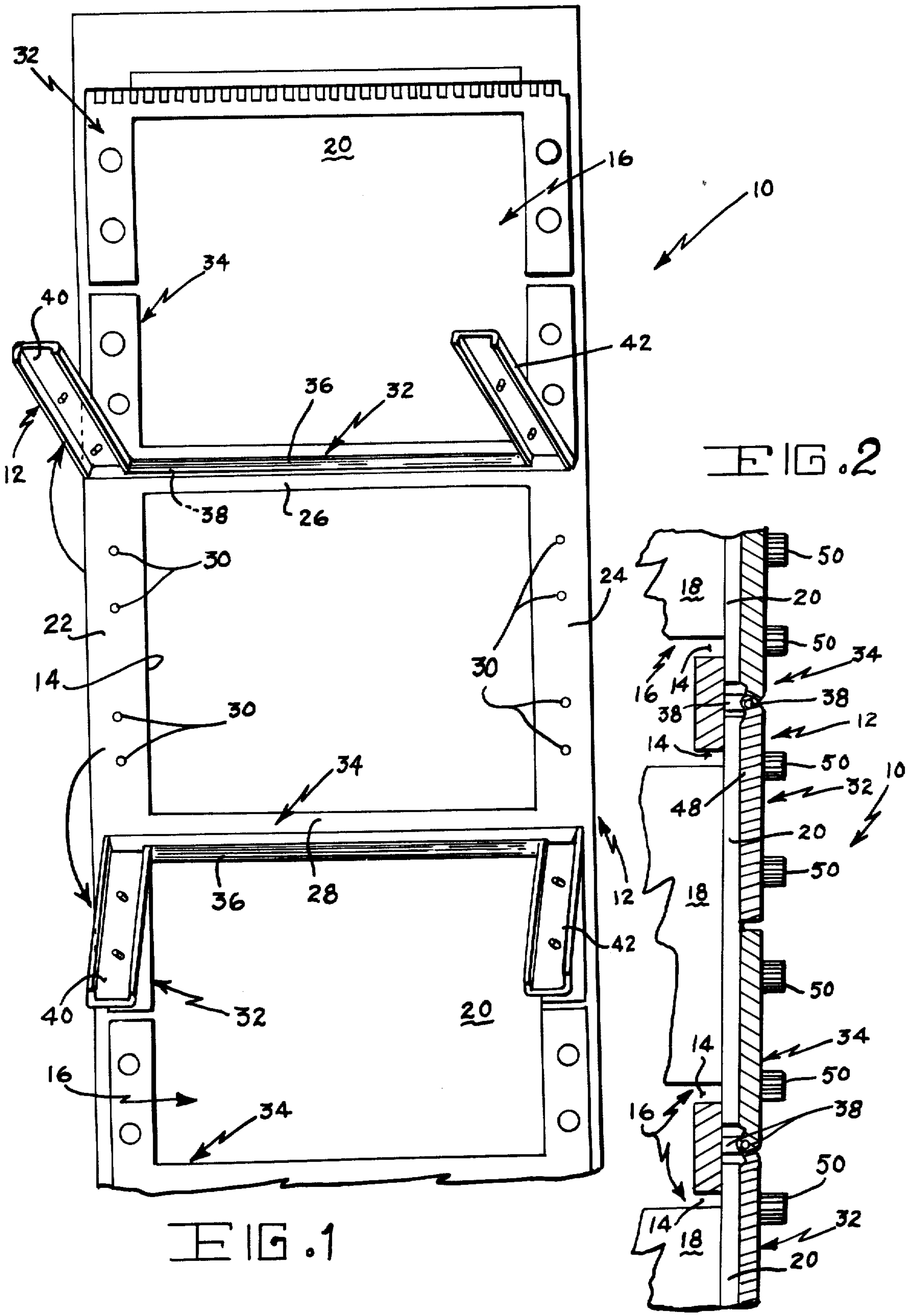
FIG. 1 is a pictorial representation of the cabinet closure system of this invention.
FIG. 2 is a side elevational view of a segment of the cabinet closure system of this invention shown partly in cross-section; with a portion of the cabinet structure removed for clarity

Reference is now made to FIGS. 1 and 2 of the drawing which best show an equipment cabinet 10 incorporating therein the cabinet closure system 12 of this invention. Cabinet 10 may take the form of a plurality of compartments 14 which contain therein any of a number of various types of equipment 16 such as electronic equipment, communications receivers and transmitters, X-ray equipment, diathery equipment, digital systems etc. Such equipment 16 is generally in the form of a component box 18 mounted onto an instrument panel 20.

As shown in FIG. 1 cabinet 10 has four flat sides 22, 24, 26 and 28 which surrounds a compartment 14 (the middle compartment being shown empty in FIG. 1). It should be noted that although only one such compartment 14 will be described in detail, all other compartments 14 are identical in construction. Opposite sides 22 and 24 have a plurality of screw apertures 30 therein while opposite sides 26 and 28 have attached thereto closure elements 32 and 34.

Figures 3, 4:
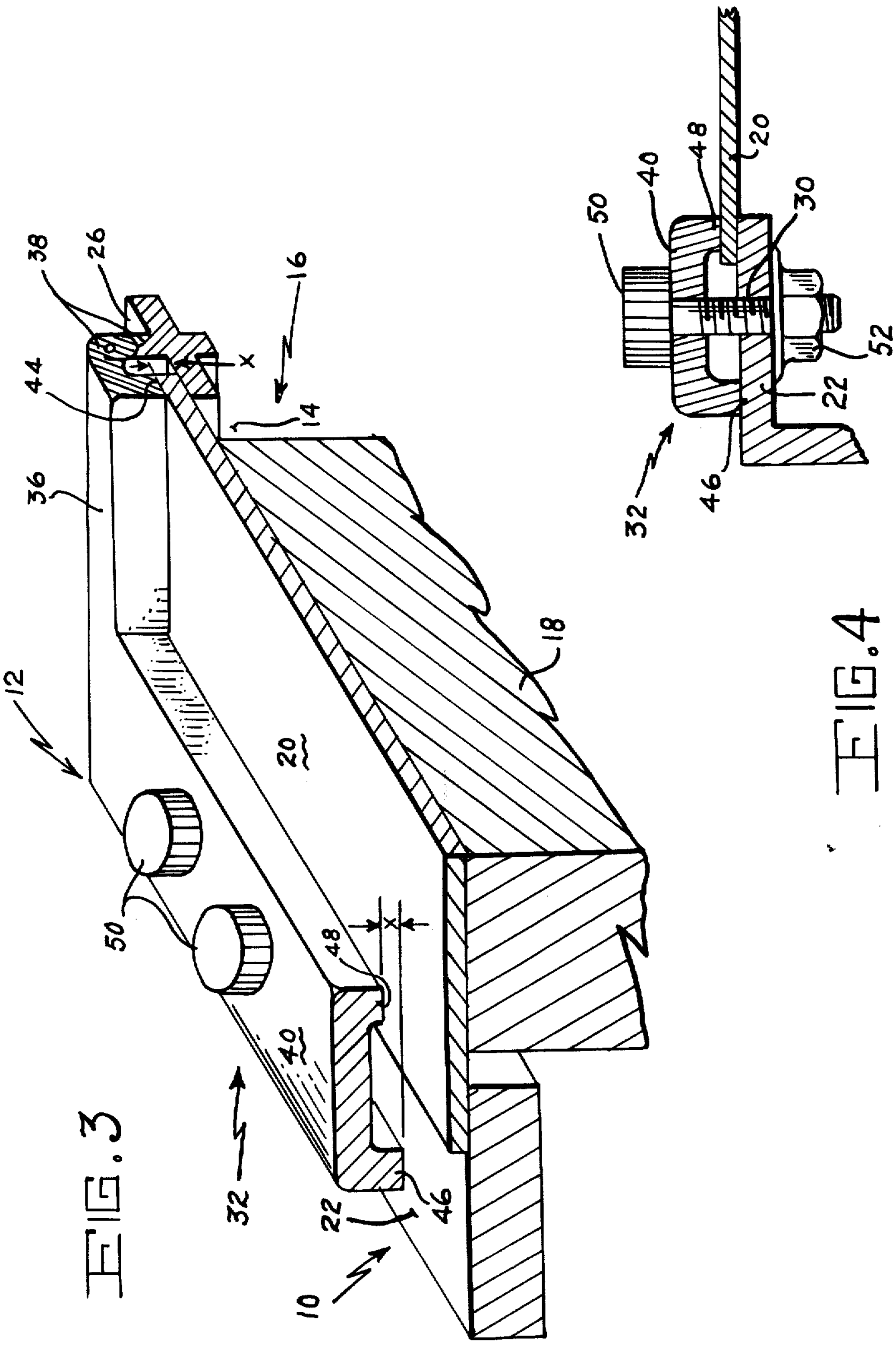
FIG. 3 is a pictorial view of a portion of the cabinet closure system of this invention shown partly in cross-section.
FIG. 4 is a side elevational view of the finger bolt securing arrangement of the cabinet closure system of this invention shown partly in cross-section.

Reference is now made to FIG. 3 which best shows a portion of closure element 32 in the closed position holding equipment 16 in place within a compartment 14. Closure elements 32 and 34 are identical in design each being made of a U-shaped design pivotally secured by its bottom segment or arm 36 to a side 26 of cabinet 10 by any conventional hinge arrangement 38. Arms 40 and 42 make up the remainder of the U-shaped design. Bottom segment 36 has an outstanding element or pressure rim 44 which is situated at a predetermined distance X above flat side 26 of cabinet 10. This distance X forms a space which houses the panel 20 of equipment 16. Arms 40 and 42 are each of a channel-shape configuration having outstanding elements or pressure rims 46 and 48. One of the outstanding elements 46, which bears against side 22 when closure element 32 is in the closed or sealed position, is of a predetermined size greater than element 48 with respect to the top surface of arm 40. Such an arrangement allows for panel 20 to be wedged between side 22 and pressure rim 48. As can be seen from FIG. 3 of the drawing elements 48 and 44 are of the same predetermined distance X from sides 22 and 26, respectively, when closure element 32 is in the sealed position. The space or distance X may be varied with the thickness of panel 20 so as to form a tight RFI seal between equipment 16 and cabinet 10.

In order to lock closure element 32 in place a plurality of finger bolts 50 are mounted in arms 40 and 42. These finger bolts 50 are aligned with apertures 30 in sides 22 and 24, respectively. It should be noted that although only one closure element 32 is described in detail, all other closure elements are of similar construction, with a pair of such elements 32 and 34 forming essential elements of closure system 12 of this invention.

Attention is directed to FIG. 4 of the drawing which shows in detail the locking arrangement between arm 40 of closure element 32 and side 22 of cabinet 10. As seen from FIG. 4 when closure element 32 is in the closed or sealed position element or pressure rim 46 bears against side 22 while pressure rim 48 wedges panel 20 between itself and side 22. Any conventional nutplate arrangement 52 fixedly secured to the bottom of side 22 provides the mate for finger bolt 50. In some cases bolt 50 may screw directly into side 22 but for maximum strength of closure a nutplate arrangement 52 as shown is more satisfactory.

Figures 5, 6:
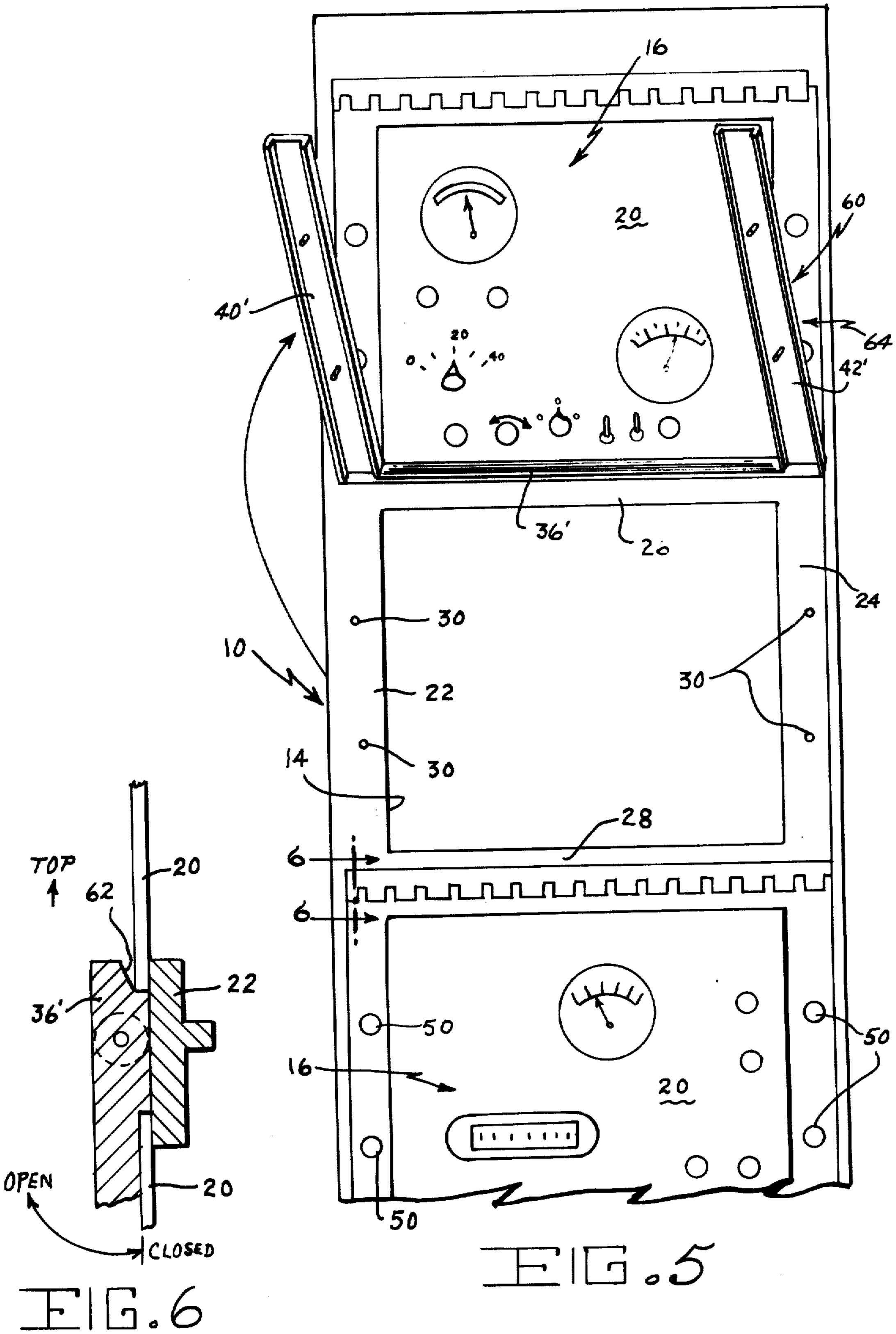
FIG. 5 is a pictorial representation of a modification of the cabinet closure system of this invention.
FIG. 6 is a side elevational view of the closure element taken along line 6—6 of FIG. 5 of the modified cabinet closure system of this invention.

In some instances it may be more desirable to replace the double closure elements 32 and 34 with a single closure element 60 as shown in FIG. 5 of the drawing. Construction of a single closure element 60 is similar to that of closure element 32 with the arms 40' and 42' being of greater length than arms 40 and 42, respectively. In addition to the above mentioned change a groove 62 is formed at the rear of bottom segment 36' so as to accommodate a panel 20 and temporarily hold equipment 16 in place before the closure element 60 is locked in place. All other features of the modified closure system 64 shown in FIG. 5 are identical to closure system 12 and are therefore not described in detail.

Although this invention has been described with reference to particular embodiments, it will be understood to those skilled in the art that this invention is also capable of a variety of other embodiments within the spirit and scope of the appended claims.

We claim:

1. In a cabinet having at least one compartment surrounded by four sides, the improvement therein being a cabinet closure system, said closure system comprising at least one closure element, said closure element being of a U-shaped design having a bottom segment and a pair of arms, each of said arms being of a channel-shaped configuration and said bottom segment being pivotally secured to one of said sides and having pressure rims thereon capable of securely wedging a piece of equipment between said sides of said cabinet and said pressure rims and means attached to said closure element for fixedly securing said closure element to said cabinet.

2. In a cabinet as defined in claim 1 wherein each of said arms has a first and second pressure rim, the first pressure rim being of a greater length than said second pressure rim whereby said equipment is wedged between said pressure rims and said sides of said cabinet.

3. In a cabinet as defined in claim 2 wherein said bottom segment has a pressure rim, the distance between the top surface of said sides of said cabinet and the bottom surface of said pressure rim of said bottom segment is substantially the same as the distance between the top surface of said sides of said cabinet and the bottom surface of said second pressure rim.

4. In a cabinet as defined in claim 3 wherein said means for fixedly securing said closure element to said cabinet is located in said arms and is made up of at least one finger bolt capable of engaging a side of said cabinet.

5. In a cabinet as defined in claim 4 further comprising at least one aperture in said cabinet side aligned with said finger bolt and means fixedly secured adjacent said aperture for engaging said finger bolt.

6. In a cabinet as defined in claim 5 wherein said bottom segment contains a groove therein for accommodating said equipment.

7. In a cabinet as defined in claim 6 further comprising another closure element pivotally secured to a side in said cabinet opposite said side which secures said one closure element.

8. In a cabinet as defined in claim 7 further comprising a pair of finger bolts in each of said arms.

9. In a cabinet as defined in claim 8 wherein said closure element is made of metal.

* * * * *